(12) United States Patent
Liang et al.

(10) Patent No.: US 10,714,074 B2
(45) Date of Patent: Jul. 14, 2020

(54) METHOD FOR READING WEBPAGE INFORMATION BY SPEECH, BROWSER CLIENT, AND SERVER

(71) Applicant: GUANGZHOU UCWEB COMPUTER TECHNOLOGY CO., LTD., Guangzhou (CN)

(72) Inventors: Jie Liang, Guangzhou (CN); Weiyong Wu, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 67 days.

(21) Appl. No.: 15/921,336

(22) Filed: Mar. 14, 2018

(65) Prior Publication Data

US 2018/0204563 A1    Jul. 19, 2018

Related U.S. Application Data (63) Continuation of application No. PCT/CN2016/079635, filed on Apr. 19, 2016.

(30) Foreign Application Priority Data

Sep. 16, 2015    (CN) .......................... 2015 1 0591191

(51) Int. Cl.
*G10L 13/04* (2013.01)
*H04L 29/08* (2006.01)
(Continued)

(52) U.S. Cl.
CPC ............ *G10L 13/04* (2013.01); *G06F 40/205* (2020.01); *G10L 13/043* (2013.01);
(Continued)

(58) Field of Classification Search
None
See application file for complete search history.

(56) References Cited

U.S. PATENT DOCUMENTS 6,163,769 A    12/2000 Acero et al.
6,546,082 B1 *   4/2003 Alcendor ............. H04Q 3/0029
                                                    379/52
(Continued)

FOREIGN PATENT DOCUMENTS

CN          1427394 A       7/2003
CN        101004806 A       7/2007
(Continued)

OTHER PUBLICATIONS

Baggia et al., "Speech Synthesis Markup Language (SSML) Version 1.1," WC3 Recommendation, Sep. 7, 2010 (Year: 2010).*
(Continued)

*Primary Examiner* — Douglas Godbold
(74) *Attorney, Agent, or Firm* — Sheppard Mullin Richter & Hampton LLP (57) ABSTRACT

The present disclosure provides a method, a browser client, and a server for reading web page information by speech. The browser client is installed with a text to speech (TTS) engine. The method includes: sending, by a browser client, a page access request to a server, where the page access request includes a page address and TTS identity information; receiving, by the browser client, response data returned by the server, where the response data includes a TTS standard version number determined by the server according to the TTS identity information, and TTS page data corresponding to the page address; and reading, by the browser client, the TTS page data by speech according to the TTS standard version number by using a TTS engine. In the present disclosure, page information is read by speech by using the TTS engine installed on the browser client. When it is inconvenient for a user to browse a page with eyes, and for users whose eyes have physical problems, the read page information can be listened by using a sense of hearing.

(Continued)

Therefore, a convenient hearing-based manner is provided to users to browse a page.

18 Claims, 2 Drawing Sheets

(51) Int. Cl.
    *G06F 40/205*     (2020.01)
    *G10L 13/047*     (2013.01)
    *G10L 13/08*     (2013.01)
    *H04L 29/06*     (2006.01)

(52) U.S. Cl.
    CPC ............ *G10L 13/047* (2013.01); *G10L 13/08* (2013.01); *H04L 67/02* (2013.01); *H04L 67/2842* (2013.01); *H04L 67/42* (2013.01)

(56) References Cited

U.S. PATENT DOCUMENTS

| | | | |
|---|---|---|---|
| 6,718,015 B1* | 4/2004 | Berstis | G10L 13/00 379/88.13 |
| 7,050,977 B1* | 5/2006 | Bennett | G06F 17/2775 704/270.1 |
| 7,313,525 B1* | 12/2007 | Packingham | G10L 15/22 704/270 |
| 7,373,300 B1* | 5/2008 | Bangalore | G06F 17/27 704/257 |
| 7,689,421 B2 | 3/2010 | Li et al. | |
| 7,693,719 B2 | 4/2010 | Chu et al. | |
| 7,886,006 B1 | 2/2011 | Freestone et al. | |
| 7,890,330 B2 | 2/2011 | Ozkaragoz et al. | |
| 7,987,244 B1 | 7/2011 | Lewis et al. | |
| 8,041,569 B2 | 10/2011 | Okutani et al. | |
| 8,150,695 B1* | 4/2012 | Killalea | G06Q 30/04 704/258 |
| 8,209,184 B1* | 6/2012 | Dragosh | G10L 15/30 704/270.1 |
| 8,224,647 B2 | 7/2012 | Niemeyer et al. | |
| 8,694,319 B2 | 4/2014 | Bodin et al. | |
| 9,055,147 B2 | 6/2015 | Surace et al. | |
| 9,087,024 B1* | 7/2015 | Hayden | G06F 16/958 |
| 9,196,239 B1* | 11/2015 | Taylor | G06F 3/017 |
| 9,311,912 B1 | 4/2016 | Swietlinski et al. | |
| 9,495,787 B2 | 11/2016 | Gusikhin et al. | |
| 9,626,955 B2 | 4/2017 | Fleizach et al. | |
| 2001/0047260 A1* | 11/2001 | Walker | H04M 3/4938 704/260 |
| 2002/0178007 A1* | 11/2002 | Slotznick | G09B 5/06 704/270.1 |
| 2003/0023442 A1 | 1/2003 | Akabane et al. | |
| 2004/0141597 A1* | 7/2004 | Giacomelli | H04M 3/4938 379/88.17 |
| 2004/0153323 A1* | 8/2004 | Charney | G06F 3/16 704/270.1 |
| 2005/0131698 A1 | 6/2005 | Tischer | |
| 2005/0169283 A1* | 8/2005 | Jindal | H04M 3/4938 370/401 |
| 2006/0041429 A1 | 2/2006 | Amato et al. | |
| 2006/0095265 A1* | 5/2006 | Chu | G10L 13/033 704/268 |
| 2006/0111911 A1* | 5/2006 | Morford | G10L 13/043 704/270.1 |
| 2006/0122836 A1* | 6/2006 | Cross, Jr. | G10L 15/30 704/260 |
| 2006/0200355 A1* | 9/2006 | Sideman | G10L 13/047 704/277 |
| 2007/0118377 A1 | 5/2007 | Badino et al. | |
| 2007/0211071 A1* | 9/2007 | Slotznick | G06F 16/957 345/594 |
| 2008/0208593 A1* | 8/2008 | Ativanichayaphong | G10L 15/24 704/275 |
| 2009/0254345 A1* | 10/2009 | Fleizach | G10L 13/043 704/260 |
| 2010/0138224 A1* | 6/2010 | Bedingfield, Sr. | G10L 15/22 704/275 |
| 2010/0153108 A1 | 6/2010 | Szalai et al. | |
| 2010/0312563 A1* | 12/2010 | Zhao | G10L 13/06 704/260 |
| 2012/0069974 A1 | 3/2012 | Zhu et al. | |
| 2013/0144624 A1* | 6/2013 | Conkie | G10L 13/04 704/260 |
| 2013/0238339 A1* | 9/2013 | Fleizach | G10L 13/033 704/260 |
| 2013/0325477 A1 | 12/2013 | Mitsui et al. | |
| 2014/0236602 A1* | 8/2014 | Graham | G10L 13/02 704/258 |
| 2014/0297285 A1* | 10/2014 | Zhang | G06F 16/9577 704/260 |
| 2015/0149168 A1* | 5/2015 | Stent | G06F 16/95 704/235 |
| 2016/0203814 A1* | 7/2016 | Cho | G06F 17/2235 704/260 |
| 2016/0306784 A1* | 10/2016 | Bradley | G06F 17/243 |
| 2016/0343366 A1* | 11/2016 | Fructuoso | G10L 13/08 |
| 2019/0043474 A1* | 2/2019 | Kingsbury | G10L 13/10 |

FOREIGN PATENT DOCUMENTS

| | | |
|---|---|---|
| CN | 101047525 A | 10/2007 |
| CN | 102254550 A | 11/2011 |
| CN | 202838716 U | 3/2013 |
| CN | 104078038 A | 10/2014 |

OTHER PUBLICATIONS

International Search Report and Written Opinion for Application No. PCT/CN2016/079635, dated Jun. 27, 2016, 9 pages.

PCT International Preliminary Report on Patentability dated Mar. 29, 2018, issued in related International Application No. PCT/CN2016/079635, with English machine translation (14 pages).

First Search dated Dec. 20, 2018, issued in related Chinese Application No. 201510591191.8, downloaded from China and Global Patent Examination Information Inquiry on Jul. 25, 2019 (1 page).

First Office Action dated Dec. 29, 2018, issued in related Chinese Application No. 201510591191.8, with English machine translation (23 pages).

Second Office Action dated May 20, 2019, issued in related Chinese Application No. 201510591191.8 (6 pages).

\* cited by examiner

METHOD FOR READING WEBPAGE INFORMATION BY SPEECH, BROWSER CLIENT, AND SERVER

CROSS-REFERENCE TO RELATED APPLICATIONS

This application is a continuation application of International Application No. PCT/CN2016/079635, filed on Apr. 19, 2016, which is based on and claims priority to and benefits of Chinese Patent Application No. 201510591191.8, filed with the State Intellectual Property Office (SIPO) of the People's Republic of China on Sep. 16, 2015. The entire contents of the above-identified application are incorporated herein by reference.

TECHNICAL FIELD

The present disclosure relates to the field of Internet communication, and more specifically, to a method, a browser client and a server for reading web page information by speech.

BACKGROUND

Currently, terminals are installed with browsers, and users often browse web pages by browsers. Web pages generally include information such as text, pictures, or videos, and the information is all based on visual senses of users. When a user browses a web page by a browser, a terminal displays the web page on a screen of the terminal, and the user needs to view the web page with eyes to browse the web page.

However, there are some scenarios in daily life in which it is inconvenient to browse a web page with eyes. For example, when a user is driving a car, or a user is taking a congested public transportation tool, or a user is walking or running, it is inconvenient for the user to browse a web page with eyes, and the eyes of the user are even damaged. In addition, users whose eyes have physical defects such as a blind person or an amblyopia person cannot browse a web page with eyes at all. Meanwhile, in daily life, when browsing a long-text web page (for example, browsing a fiction web page) with eyes for a long time, even users with eyes having no physical problems usually feel fatigue of eyes, and even suffer from vision deterioration.

We finds that, in the foregoing cases in which it is inconvenient to browse a web page with eyes or fatigue of eyes caused by browsing a web page for a long time, the related art has not provided a manner of conveniently providing web page information to users, affecting user experience of a browser.

SUMMARY

An objective of the present disclosure is to provide a method, a browser client, and a server for reading web page information by speech. In this way, page information is read by speech by using a text to speech (TTS) engine installed on a browser client, and a user browses a web page in a new hearing-based manner.

According to a first aspect of the present disclosure, a method for reading web page information by speech is provided, including:

sending, by a browser client, a page access request to a server, where the page access request includes a page address and TTS identity information;

receiving, by the browser client, response data returned by the server according to the page access request, where the response data includes a TTS standard version number determined by the server according to the TTS identity information, and TTS page data corresponding to the page address; and reading, by the browser client, the TTS page data by speech according to the TTS standard version number by using a TTS engine.

With reference to the first aspect of the present disclosure, an embodiment of the present disclosure provides a first possible implementation of the first aspect, where the reading, by the browser client, the TTS page data by speech according to the TTS standard version number by using a TTS engine includes:

obtaining, by the browser client, a corresponding TTS standard protocol according to the TTS standard version number;

parsing out, by the browser client, global reading information, local reading information, and to-be-read data from the TTS page data according to the TTS standard protocol; and obtaining, by the browser client by using the TTS engine, speech data corresponding to the to-be-read data, and reading the speech data according to the global reading information and the local reading information.

With reference to the first possible implementation of the first aspect, an embodiment of the present disclosure provides a second possible implementation of the first aspect, where the obtaining, by the browser client by using the TTS engine, speech data corresponding to the to-be-read data includes:

determining, by the browser client, an engine type of the TTS engine, where the engine type includes a full-function engine and a compact engine;

if the engine type of the TTS engine installed on the browser client is the full-function engine, invoking, by the browser client, a local speech database by using the TTS engine, to convert the to-be-read data to the speech data; and if the engine type of the TTS engine installed on the browser client is the compact engine, loading, by the browser client, recorded speech resource data from the server, and invoking the loaded recorded speech resource data by using the TTS engine, to convert the to-be-read data to the speech data.

With reference to the first possible implementation of the first aspect, an embodiment of the present disclosure provides a third possible implementation of the first aspect, where the parsing out, by the browser client, global reading information, local reading information, and to-be-read data from the TTS page data according to the TTS standard protocol includes:

parsing out, by the browser client, the global reading information from header information of the TTS page data according to the TTS standard protocol;

identifying, by the browser client from the TTS page data, a data block corresponding to a preset tag, and determining the identified data block as the to-be-read data; and obtaining, by the browser client, the local reading information from identified tag starting information of the preset tag. Tag starting information includes information or a marker representing the start of the tag.

With reference to the first aspect, an embodiment of the present disclosure provides a fourth possible implementation of the first aspect, where if the engine type of the TTS engine is the full-function engine, and the browser client reads the TTS page data by speech according to the TTS standard version number by using the TTS engine, the method further includes:

collecting, by the browser client, speech information of a user, and identifying the speech information of the user as text information by using the TTS engine; and if the text information matches preset speech playing control information, performing a corresponding speech playing control operation.

According to a second aspect of the present disclosure, a method for reading web page information by speech is provided. The method includes:

receiving, by a server, a page access request sent by a browser client, where the page access request includes a page address and TTS identity information;

determining, by the server, a TTS standard version number according to the TTS identity information, and obtaining, according to the page address and the TTS identity information, TTS page data corresponding to the page address; and sending, by the server, the TTS page data and the TTS standard version number to the browser client as response data, so that the browser client reads the TTS page data by speech according to the TTS standard version number.

With reference to the second aspect, an embodiment of the present disclosure provides a first possible implementation of the second aspect, where the TTS identity information includes the TTS standard version number supported by the browser client and an engine type of the TTS engine installed on the browser client; and the obtaining, by the server according to the page address and the TTS identity information, TTS page data corresponding to the page address includes:

loading, by the server, corresponding page data according to the page address; and performing, by the server, TTS tagging on the page data according to the TTS standard version number supported by the browser client and the engine type, to obtain the TTS page data corresponding to the page address.

With reference to the second aspect, an embodiment of the present disclosure provides a second possible implementation of the second aspect, where the TTS identity information includes the TTS standard version number supported by the browser client and an engine type of the TTS engine installed on the browser client; and the obtaining, by the server according to the page address and the TTS identity information, TTS page data corresponding to the page address includes:

querying, by the server according to the TTS identity information and the page address, a local cache to determine whether there is corresponding TTS page data; and if there is corresponding TTS page data, obtaining the TTS page data directly from the local cache; and when it is found that the local cache has no corresponding TTS page data, loading, by the server, corresponding page data according to the page address; and performing TTS tagging on the page data according to the TTS standard version number supported by the browser client and the engine type, to obtain the TTS page data corresponding to the page address.

With reference to the second aspect and the first or the second possible implementation of the second aspect, an embodiment of the present disclosure provides a third possible implementation of the second aspect, where the performing, by the server, TTS tagging on the page data according to the TTS standard version number supported by the browser client and the engine type includes:

determining, by the server according to the TTS standard version number supported by the browser client, a TTS standard version tag set supported by the browser client; and determining, according to the engine type, a TTS tag policy corresponding to the engine type;

adding, by the server, global reading information to header information of the page data according to the TTS standard version tag set and the TTS tag policy; and determining, by the server in the page data, a data block that needs to be read by speech, tagging the data block according to the TTS standard version tag set and the TTS tag policy by using a preset tag, and adding local reading information to tag starting information of the preset tag.

With reference to the second possible implementation of the second aspect, an embodiment of the present disclosure provides a fourth possible implementation of the second aspect, where after the performing, by the server, TTS tagging on the page data, to obtain the TTS page data corresponding to the page address, the method further includes:

storing, by the server, the TTS identity information, the page address, and the TTS page data in the local cache.

With reference to the second aspect, an embodiment of the present disclosure provides a fifth possible implementation of the second aspect, where the TTS identity information includes the TTS standard version number supported by the browser client; and the determining, by the server, a TTS standard version number according to the TTS identity information includes:

comparing, by the server, the TTS standard version number supported by the browser client with a version number supported by the server;

when the TTS standard version number supported by the browser client is higher than the version number supported by the server, determining, by the server, the version number supported by the server as the TTS standard version number; and when the TTS standard version number supported by the browser client is lower than or equal to the version number supported by the server, determining, by the server, the TTS standard version number supported by the browser client as the TTS standard version number.

With reference to the second aspect, an embodiment of the present disclosure provides a sixth possible implementation of the second aspect, where the method further includes:

determining, by the server, whether the engine type of the TTS engine that is included in the TTS identity information of the page access request is a compact engine; and when determining that the engine type is the compact engine, obtaining speech resource data stored by the server, and sending the speech resource data to the browser client; or receiving, by the server, a speech resource data obtaining request sent by the browser client, obtaining speech resource data stored by the server, and sending the speech database to the browser client.

According to a third aspect of the present disclosure, a browser client is provided. The browser client is installed with a TTS engine. The browser client includes:

a sending module, configured to send a page access request to a server, where the page access request includes a page address and TTS identity information;

a receiving module, configured to receive response data returned by the server according to the page access request, where the response data includes a TTS standard version number determined by the server according to the TTS identity information, and TTS page data corresponding to the page address; and a speech reading module, configured to read the TTS page data by speech according to the TTS standard version number by using a TTS engine.

With reference to the third aspect, an embodiment of the present disclosure provides a first possible implementation of the third aspect, where the speech reading module includes:

an obtaining unit, configured to obtain a corresponding TTS standard protocol according to the TTS standard version number;

a parsing unit, configured to parse out global reading information, local reading information, and to-be-read data from the TTS page data according to the TTS standard protocol; and a reading unit, configured to: obtain, by using the TTS engine, speech data corresponding to the to-be-read data, and read the speech data according to the global reading information and the local reading information.

With reference to the first possible implementation of the third aspect, an embodiment of the present disclosure provides a second possible implementation of the third aspect, where the reading unit includes:

a determining subunit, configured to determine an engine type of the TTS engine, where the engine type includes a full-function engine and a compact engine;

a first conversion subunit, configured to: if the engine type of the TTS engine installed on the browser client is the full-function engine, invoke a local speech database by using the TTS engine, to convert the to-be-read data to the speech data; and a second conversion subunit, configured to: if the engine type of the TTS engine installed on the browser client is the compact engine, load recorded speech resource data from the server, and invoke the loaded recorded speech resource data by using the TTS engine, to convert the to-be-read data to the speech data.

With reference to the first possible implementation of the third aspect, an embodiment of the present disclosure provides a third possible implementation of the third aspect, where the parsing unit includes:

a parsing subunit, configured to parse out the global reading information from header information of the TTS page data according to the TTS standard protocol;

an identification subunit, configured to: identify, from the TTS page data, a data block corresponding to a preset tag, and determine the identified data block as the to-be-read data; and an obtaining subunit, configured to obtain the local reading information from identified tag starting information of the preset tag.

With reference to the third aspect, an embodiment of the present disclosure provides a fourth possible implementation of the third aspect, where if the engine type of the TTS engine is the full-function engine, and the speech reading module reads by speech, the browser client further includes:

a playing control module, configured to: collect speech information of a user, and identify the speech information of the user as text information by using the TTS engine; and if the text information matches preset speech playing control information, perform a corresponding speech playing control operation.

According to a fourth aspect of the present disclosure, a server is provided. The server includes:

a receiving module, configured to receive a page access request sent by a browser client, where the page access request includes a page address and TTS identity information of the browser client;

an obtaining module, configured to: determine a TTS standard version number according to the TTS identity information, and obtain, according to the page address and the TTS identity information, TTS page data corresponding to the page address; and a sending module, configured to send the TTS page data and the TTS standard version number to the browser client as response data, so that the browser client reads the TTS page data by speech according to the TTS standard version number.

With reference to the fourth aspect, an embodiment of the present disclosure provides a first possible implementation of the fourth aspect, where the TTS identity information includes the TTS standard version number supported by the browser client and an engine type of the TTS engine installed on the browser client; and the obtaining module includes:

a loading unit, configured to load corresponding page data according to the page address; and a TTS tagging unit, configured to perform TTS tagging on the page data according to the TTS standard version number supported by the browser client and the engine type, to obtain the TTS page data corresponding to the page address.

With reference to the fourth aspect, an embodiment of the present disclosure provides a second possible implementation of the fourth aspect, where the TTS identity information includes the TTS standard version number supported by the browser client and an engine type of the TTS engine installed on the browser client; and the obtaining module includes:

a querying unit, configured to: query, according to the TTS identity information and the page address, a local cache to determine whether there is corresponding TTS page data; and if there is corresponding TTS page data, obtain the TTS page data directly from the local cache; and an obtaining unit, configured to: when it is found that the local cache has no corresponding TTS page data, load corresponding page data according to the page address; and perform TTS tagging on the page data according to the TTS standard version number supported by the browser client and the engine type, to obtain the TTS page data corresponding to the page address.

With reference to the fourth aspect and the first or the second possible implementation of the fourth aspect, an embodiment of the present disclosure provides a third possible implementation of the fourth aspect, where the performing TTS tagging on the page data according to the TTS standard version number supported by the browser client and the engine type includes:

a determining subunit, configured to: determine, according to the TTS standard version number supported by the browser client, a TTS standard version tag set supported by the browser client; and determine, according to the engine type, a TTS tag policy corresponding to the engine type;

an adding subunit, configured to add global reading information to header information of the page data according to the TTS standard version tag set and the TTS tag policy; and a tagging subunit, configured to: determine, in the page data, a data block that needs to be read by speech, tag the data block according to the TTS standard version tag set and the TTS tag policy by using a preset tag, and add local reading information to tag starting information of the preset tag.

With reference to the second possible implementation of the fourth aspect, an embodiment of the present disclosure provides a fourth possible implementation of the fourth aspect, where the server further includes:

a storing module, configured to store the TTS identity information, the page address, and the TTS page data in the local cache.

With reference to the fourth aspect, an embodiment of the present disclosure provides a fifth possible implementation of the fourth aspect, where the TTS identity information includes the TTS standard version number supported by the browser client; and the obtaining module includes:

a comparing unit, configured to compare the TTS standard version number supported by the browser client with a version number supported by the server;

a first determining unit, configured to: when the TTS standard version number supported by the browser client is higher than the version number supported by the server, determine the version number supported by the server as the TTS standard version number; and a second determining unit, configured to: when the TTS standard version number supported by the browser client is lower than or equal to the version number supported by the server, determine the TTS standard version number supported by the browser client as the TTS standard version number.

With reference to the fourth aspect, an embodiment of the present disclosure provides a sixth possible implementation of the fourth aspect, where the server further includes:

an obtaining and sending module, configured to: determine whether the engine type of the TTS engine that is included in the TTS identity information of the page access request is a compact engine; and when determining that the engine type is the compact engine, obtain speech resource data stored by the server, and send the speech resource data to the browser client; or the obtaining and sending module is further configured to: receive a speech resource data obtaining request sent by the browser client, obtain speech resource data stored by the server, and send the speech resource data to the browser client.

According to a fifth aspect of the present disclosure, a browser client device is provided, including a memory and a processor. The memory is configured to store instructions, and the instructions are used to control the processor to perform an operation to execute any method for reading web page information by speech in the first aspect of the present disclosure.

According to a sixth aspect of the present disclosure, a server device is provided, including a memory and a processor. The memory is configured to store instructions, and the instructions are used to control the processor to perform an operation to execute any method for reading web page information by speech in the second aspect of the present disclosure.

In the embodiments of the present disclosure, the browser client is installed with the TTS engine. The browser client sends the page access request including the page address and the TTS identity information to the server, receives the TTS page data that is returned by the server according to the page access request and that corresponds to the TTS standard version number and the page address, and reads the TTS page data by speech according to the TTS standard version number by using the TTS engine. In the present disclosure, page information is read by speech by using the TTS engine installed on the browser client. When it is inconvenient for a user to browse a web page with eyes or fatigue is caused because a web page has been browsed with eyes, and for users whose eyes have physical defects, read page information can be listened by using a sense of hearing. Therefore, a convenient hearing-based manner is provided to users to browse a web page.

To make the objectives, features, and advantages of the present disclosure more comprehensible, the following provides detailed descriptions by specially listing preferred embodiments and with reference to the accompanying drawings.

BRIEF DESCRIPTION OF THE DRAWINGS

The present disclosure will become apparent and more readily appreciated from the following descriptions made with reference to the drawings. To more clearly describe the technical solutions of the embodiments of the present disclosure, the following briefly describes the accompanying drawings required in the embodiments. It should be understood that the following accompanying drawings show only some embodiments of the present disclosure, and therefore shall not be considered as limitation on the scope, and a person of ordinary skill in the art may further obtain other related accompanying drawings according to the accompanying drawings without creative work.

DETAILED DESCRIPTION

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. Generally, components in the embodiments of the present disclosure described and shown herein in the accompanying drawings may be arranged and designed in various different configurations. Therefore, the following detailed descriptions of the embodiments of the present disclosure provided in the accompanying drawings do not intend to limit the claimed scope of the present disclosure, and only indicate optional embodiments of the present disclosure. All other embodiments obtained by persons skilled in the art based on the embodiments of the present disclosure without any creative work fall within the protection scope of the present disclosure.

In cases in which it is inconvenient to browse a web page with eyes, and for users whose eyes have physical problems, the related art currently has not provided a manner of conveniently providing web page information to users, affecting user experience of a browser. Bases on this consideration, an embodiment of the present disclosure provides a method, a browser client, and a server for reading web page information by speech. The following provides descriptions with exemplary embodiments.

Embodiment 1

Figure 1:
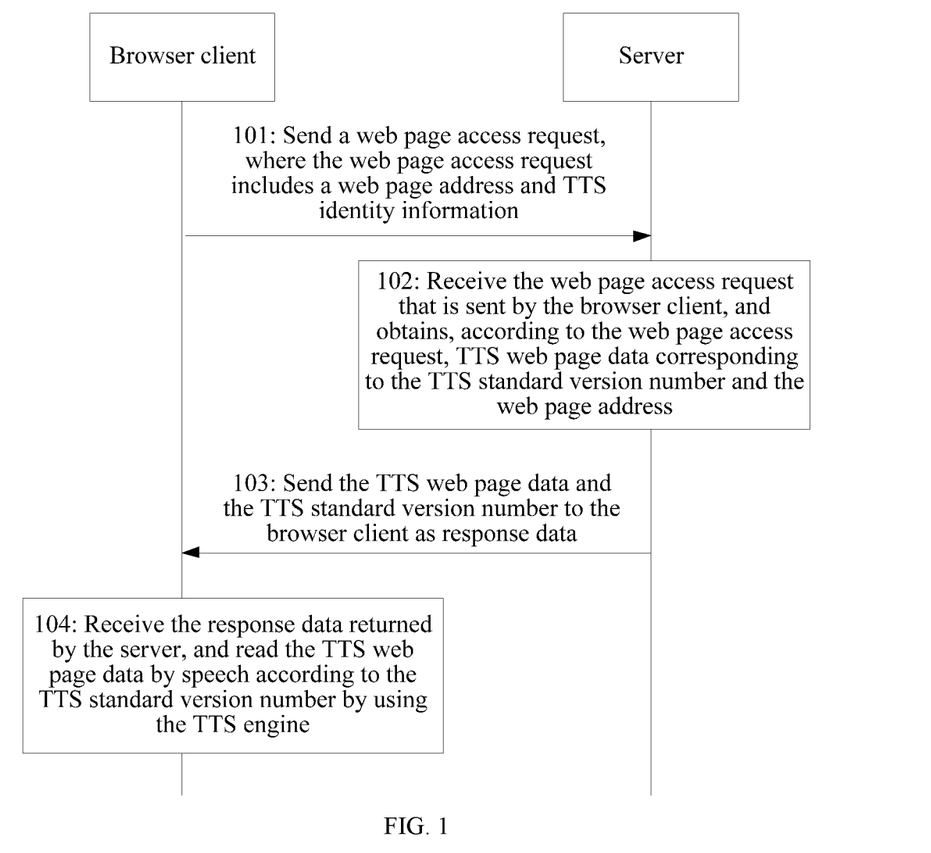
FIG. 1 is a flowchart of a method for reading web page information by speech according to Embodiment 1 of the present disclosure.

Referring to FIG. 1, an embodiment of the present disclosure provides a method for reading web page information by speech. In this embodiment of the present disclosure, the browser client is installed with a text to speech (TTS) engine. The TTS engine may be a component installed in a browser client, or the TTS engine is a system service or an application program that can be invoked by a browser client. In this embodiment of the present disclosure, page information of a web page that needs to be accessed is read by using the TTS engine. The method specifically includes the following steps:

Step 101: A browser client sends a page access request to a server, where the page access request includes a page address and TTS identity information.

The server may be a website server or a browser background server. The TTS identity information includes an engine type of the TTS engine installed on the browser client and a TTS standard version number supported by the browser client. The engine type of the TTS engine includes a full-function engine and a compact engine.

A TTS engine whose type is the full-function engine includes a speech database integrated locally, and can identify, based on texts, an encoding set and a language type used by the TTS engine, perform word segmentation on provided texts in real time based on a dictionary set, generate speech data by using the locally integrated speech database, be associated with texts of the speech data, and support a speech playing control operation, such as a playing control operation of start, pause, replay, or playing stop. In addition, the full-function TTS engine can further support a speech identification function of a user, and convert a speech of the user to a playing control operation.

A TTS engine whose type is the compact engine can identify, based on texts, an encoding set and a language type used by the TTS engine, perform word segmentation on provided texts in real time based on a dictionary set, be associated with texts of speech playing resources, and similarly support a speech playing control operation, such as a playing control operation of start, pause, replay, or playing stop.

A difference between the full-function TTS engine and the compact TTS engine is that the full-function TTS engine has a locally integrated speech database, but the compact TTS engine has no locally integrated speech database, and the compact TTS engine supports neither local real-time speech play nor speech identification of the user. The compact TTS engine is applied to mobile devices having lower hardware configuration conditions.

In this embodiment of the present disclosure, when the user needs to browse a web page, the user enters a page address of the web page on the browser client, or the user clicks a link corresponding to the web page. When the browser client detects the page address entered by the user or detects that a link is clicked, the browser client obtains the page address entered by the user or obtains a page address corresponding to the link, obtains the engine type of the TTS engine and the supported TTS standard version number from a TTS functional module installed on the browser client, form the TTS identity information by using the obtained engine type and the obtained TTS standard version number supported by the browser client, sends the page access request to the server, and adds the obtained page address and the obtained TTS identity information to the page access request.

Step 102: The server receives the page access request that is sent by the browser client and that includes the page address and the TTS identity information, and obtains, according to the page access request, TTS page data corresponding to the TTS standard version number and the page address.

The server obtains, according to the page address and the TTS identity information included in the page access request, the TTS page data corresponding to the page address, and determines the TTS standard version number according to the TTS identity information.

The operation of obtaining, by the server according to the page address and the TTS identity information, TTS page data corresponding to the page address specifically includes: loading, by the server, corresponding page data according to the page address; and performing TTS tagging on the page data according to the TTS standard version number supported by the browser client and the engine type of the TTS engine, to obtain the TTS page data corresponding to the page address.

The operation of performing TTS tagging on the page data specifically includes: determining, by the server according to the TTS standard version number supported by the browser client, a TTS standard version tag set supported by the browser client; and determining, according to the engine type of the TTS engine, a TTS tag policy corresponding to the engine type; adding global reading information to header information of the loaded page data according to the determined TTS standard version tag set and the determined TTS tag policy; and determining, in the page data, a data block that needs to be read by speech, tagging the data block according to the TTS standard version tag set and the TTS tag policy by using a preset tag, and adding local reading information to tag starting information of the preset tag. Tag starting information includes information or a marker representing the start of the tag.

In this embodiment of the present disclosure, the TTS standard version tag set includes an html label supporting TTS tagging, a dedicated TTS label, an available TTS attribute, and the like. The html label that supports TTS tagging may be an html label directly or indirectly having texts, the dedicated TTS label is a preset tag, and the preset tag may be a reading label <speech>. The available TTS attribute includes global reading information and local reading information. The global reading information is text TTS attribute information of a global page function domain. The local reading information is TTS attribute information of a preset tag function domain.

Html labels that support TTS tagging in TTS standard version tag sets supported by TTS engines of different versions may be different. Therefore, the TTS tag set supported by the browser client needs to be determined according to the TTS standard version number supported by the browser client.

Because the full-function TTS engine and the compact TTS engine are different in functions, the server presets a TTS tag policy corresponding to the full-function TTS engine and a TTS tag policy corresponding to the compact TTS engine. How to tag a TTS speech resource depends on the TTS tag policy.

A data block that needs to be read by speech may be a data block formed by html labels directly or indirectly having texts. The html labels directly or indirectly having texts include a hyperlink label <a>, a bold label <b>, a big font label <big>, a block quote label <blockquote>, a reference citation label <cite>, a detail description label <details>, a phrase element label <dfn>, a text style label <font>, a footer label <footer>, a header label <header>, an italic text label <i>, a mark text label <mark>, a highlight label <m>, a common text label <p>, a short quote label <q>, a small font label <small>, an emphasis label <strong>, and a description label <summary>. The preset tag may be a reading label <speech>.

The server determines, the TTS standard version tag set supported by the browser client, according to the TTS standard version number supported by the browser client; determines the corresponding TTS tag policy according to the engine type of the TTS engine; and according to the determined TTS standard version tag set and the determined TTS tag policy, adds the global reading information corresponding to the tag policy to the header information of the loaded page data, traverses each label information in the page data, determines information about the html labels directly or indirectly having texts, determines the determined label information as the data block that needs to be read by speech, sets the determined data block as label content of the preset tag <speech>, and adds the local reading information corresponding to the TTS tag policy to the preset tag <speech>.

For ease of understanding of the TTS tagging operation on a data block, an example is used herein for description. For example, it is assumed that the determined data block is <p>Hello, baby!</p>, and the local reading information corresponding to the TTS tag policy is role="female"; text-type="main-body"; speeding="normal"; positioning="xpath"; playback-mode="local"; playback="exclusive".

Data obtained after TTS tagging is: <speech role="female"; text-type="main-body"; speeding= "normal"; positioning="xpath"; playback-mode="local"; playback="exclusive"> <p>Hello, baby!</p> </speech>.

Related information of attributes and attribute values included in the global reading information is as follows:

Version (version number): This attribute is a necessary attribute, and an attribute value of the attribute may be an initial version number, for example, an initial version 1.0. The attribute is used to control a version of a TTS standard, related labels or attributes supported by different versions are different, and the version of the TTS standard needs to be backward compatible, that is, the TTS standard of a new version also supports a TTS standard of an old version.

2: Type (type): This attribute is also a necessary attribute, and an attribute value of the attribute may be full (full-function type) or lite (compact type). Full indicates that speech play on a current page requires the TTS full-function engine, and lite indicates that speech play on a current page requires only the TTS compact engine. Whether a specified value of the attribute is full or lite needs to be determined according to the TTS identity information carried in the page access request sent by the browser client. When the TTS identity information carried in the page access request sent by the browser client does not include the engine type, the specified value of the attribute may be full or lite by default.

3: Speed (speed): This attribute is an optional attribute, an attribute value of the attribute may be slow (slow), normal (normal), or fast (fast), and the attribute is used to define a page playing speed of the TTS engine. The attribute value of the attribute needs to be set based on the TTS standard supported by the TTS engine installed on the browser client. The attribute value of the attribute is not limited to the foregoing three cases, and may be further set to other more detailed playing speeds.

4: Role (role): This attribute is also an optional attribute, and an attribute value of the attribute may be male (male), female (female), and user-defined (defined by a user). When the attribute value is male, the TTS engine invokes a male voice speech database, when the attribute value is female, the TTS engine invokes a female voice speech database, and when the attribute value is user-defined, the TTS engine uses a speech database specified by the user in the local TTS engine. For example, the speech database specified by the user may be a Chinese speech database of a celebrity or a speech database generated by the user by recording a speech of the user. Speech dictionaries supported by the speech databases need to comply with the TTS standard. The male voice speech database and the female voice speech database are basic speech databases that need to be supported by a TTS function. When the user has not set, on the browser client, a speech database that the user wants to use, the attribute value of the attribute may be set to male or female by default.

5: Playback (playing form): This attribute is also an optional attribute, an attribute value of the attribute may be exclusive (exclusive play) and coexisting (coexisting play), exclusive indicates that when the browser client plays page information, play of another speech source in the system is forbidden, and coexisting indicates that when the browser client plays page information, play of another speech source in the system is not forbidden. When the user has not set, on the browser client, a speech database that the user wants to use, the attribute value of the attribute may be exclusive or coexisting by default.

6: Charset (character set): This attribute is also an optional attribute, an attribute value of the attribute may be auto-detect (automatic detection), and indicates automatic detection of a character set used for texts, and the character set may be in an 8-bit Unicode Transformation Format (UTF-8), GB2314, or the like. In addition, alternatively, a specific character set may be provided for this attribute. When the user has not set, on the browser client, a speech database that the user wants to use, the attribute value of the attribute may be auto-detect by default.

7: Lang: A language of texts is specified, this attribute is also an optional attribute, and the attribute value of the attribute may be auto-detect (auto-detect), and indicates automatic detection of a text language of a country/region. Alternatively, a specific language may be provided for the attribute, for example, simplified Chinese, traditional Chinese, English, or French. When the user has not set, on the browser client, a speech database that the user wants to use, the attribute value of the attribute may be auto-detect by default.

8: Vocable-control (speech playing control): This attribute is also an optional attribute, the attribute defines a keyword of a TTS play control operation for speech control, and when there are multiple keywords, the key words are separated by ",". The attribute is mainly used to indicate that an operation based on speech control is suggested for the user, but specific implementation depends on the engine type of the TTS engine. In addition, only when the server identifies that the browser client is installed with the TTS full-function engine, the attribute value may be provided. The attribute may be set to the following attribute values:

next: Switch to a next paragraph of texts on which TTS play can be performed;

previous: Switch to a previous paragraph of texts on which TTS play can be performed;

up-level: Switch to a text ancestor node for TTS play of a current text node for TTS play;

down-level: Switch to a first subnode for TTS play of a current text node for TTS play (if there is a subnode);

start: Star to play a currently selected TTS segment; (in this embodiment of the present disclosure, the TTS segment is all texts extracted from an html label tree included in speech labels);

stop: Stop playing a currently selected TTS segment;

hold: Pause playing a currently selected TTS segment;

resume: Continue to play a currently selected TTS segment from a pause location;

replay: Play a currently selected TTS segment from the start; and click: If a currently played TTS text is located in a label that can be clicked, a click operation may be triggered by using a speech.

In this embodiment of the present disclosure, when the global reading information is added to the header information of the page data, name (name) information is added to a meta (meta information) tag of the header information of the page data, a value of the name information is "tts", and corresponding content thereof may include the global reading information.

For example, the global reading information may be added to the meta tag in the following manner:

<meta name="tts" content="version:1.0;type:full; speed:normal;role:male;playback:exclusive;charset:auto-detect;lang:auto-detectvocable-control:next,previous,up-level,down-level,start,stop,hold,resume,replay,click">

The global reading information is added to the meta tag. The reasons are as follows: The meta tag is generally located at a head (head) part of an html page, and when the browser client parses the page, the browser client usually performs preprocessing on the head part. Therefore the browser client can conveniently perform corresponding attribute setting initialization on the TTS engine according to the global reading information.

In this embodiment of the present disclosure, related information of attributes and attribute values included in the local reading information is as follows:

1: Text-type (text type): This attribute is a necessary attribute, and the attribute may be set to the following attribute value: heading (heading), indicating a TTS text used as a "heading", where when a speech label includes a heading label of h1, h2, h3, h4, h5, or h6, the attribute value is suggested; and abstract (abstract), indicating a TTS text used as an "abstract".

2: Speed: Related information of this attribute is the same as related information of the speed attribute of the global reading information, and detailed descriptions are not provided herein.

3: Role: Related information of this attribute is the same as related information of the role attribute of the global reading information, and detailed descriptions are not provided herein.

4: Playback: Related information of this attribute is the same as related information of the playback attribute of the global reading information, and detailed descriptions are not provided herein.

5: Playback-mode: This attribute is also an optional attribute, and the attribute may be set to the following attribute value: local and outsourcing. Local indicates that real-time TTS play is performed by using the local speech database, and the attribute value supports only the TTS full-function engine; outsourcing indicates that a recorded speech resource is played, and the attribute value supports both the TTS compact engine and the TTS full-function engine.

When the browser client is installed with the TTS full-function engine, the server may provide both of the two attribute values, "," is used for separation, and the browser determines a playing manner.

6: Outsourcing-href: This attribute is also an optional attribute, and the attribute may be set to a recorded TTS playing speech resource. The TTS playing speech resource needs to comply with a TTS audio format specification. In addition to audio information, a text and text-speech synchronization information further need to be provided. The attribute is mainly used to support the TTS compact engine to perform online play; for the TTS full-function engine, whether to select play of a recorded speech resource or real-time play is determined based on user setting.

7: Positioning: This attribute is also an optional attribute, and the attribute indicates a location of the preset tag <speech> in all TTS segments of the page, that is, a location of a text included in a speech label. The attribute is mainly used for positioning when the user performs control over switching between TTS segments. The attribute may be set to the following attribute values: xpath: a TTS segment is positioned based on an xpath path of an html label, and this essentially indicates that a TTS segment is organized based on a structure of a page; manual: in this manner, hierarchical location information needs to be provided, a format thereof may be a first-level sequence number—a second-level sequence number—a third-level sequence number, and the like, and when the attribute value is used, organization of the TTS segment may be irrelevant to the structure of the page.

In this embodiment of the present disclosure, a priority of the local reading information is higher than a priority of the global reading information. Because the local reading information and the global reading information have a same attribute, and html ancestor and grandchild nodes of the page may have same local reading information, priorities thereof is specified as follows:

When attribute values are different, the local reading information prevails over the global reading information. For example, if the preset tag <speech> does not define the attribute, and the global reading information includes corresponding attribute definition, attribute definition of the global reading information continues to be used.

When attribute values are different, attribute definition of the grandchild node prevails over attribute definition of the ancestor node. For example, if a <speech> label of the grandchild node does not define the attribute, but a <speech> label of the ancestor node has corresponding attribute definition, attribute definition of the <speech> label of the ancestor node continues to be used.

In this embodiment of the present disclosure, for the previously processed page access request, the server may buffer, in a local cache, a correspondence among the TTS identity information, the page address, and the TTS page data corresponding to the previously processed page access request.

When the server obtains, according to the page address and the TTS identity information, the TTS page data corresponding to the page address, the server queries, according to the TTS identity information and the page address, the local cache to determine whether there is corresponding TTS page data; and if there is corresponding TTS page data, obtains the TTS page data directly from the local cache. When it is found that the local cache has no corresponding TTS page data, the server loads corresponding page data according to the page address; and performs TTS tagging on the page data according to the TTS standard version number supported by the browser client and the engine type, to obtain the TTS page data corresponding to the page address.

In this embodiment of the present disclosure, for a provided specific page, when the TTS standard version number supported by the browser client and the engine type of the TTS engine are both determinate, the TTS standard version tag set and the TTS tag policy based on which TTS tagging is performed on the page are also determinate. Therefore, a TTS tagging result of the page is also determinate. Therefore, when the local cache has no corresponding TTS page data, after the server performs TTS tagging on the page data to obtain the TTS page data corresponding to the page address, the server stores the TTS identity information, the page address, and the TTS page data in the local cache.

In this embodiment of the present disclosure, because the TTS standard may change as versions evolve, the browser client needs to state, in the page access request, the highest version supported by the browser client, and finally negotiates with the server to determine a version to be used. The version of the TTS standard needs to be backward compatible.

The operation of determining, by the server, the TTS standard version number according to the TTS identity information specifically includes: comparing, by the server, the TTS standard version number supported by the browser client with a version number supported by the server; when the TTS standard version number supported by the browser client is higher than the version number supported by the server, determining, by the server, the version number supported by the server as the TTS standard version number; and when the TTS standard version number supported by the browser client is lower than or equal to the version number supported by the server, determining, by the server, the TTS standard version number supported by the browser client as the TTS standard version number.

After the server obtains, by using the operation of step 102, the TTS standard version number and the TTS page data corresponding to the page address, the server sends the information to the browser client by using the following operation of step 103.

Step 103: The server sends the TTS page data and the TTS standard version number to the browser client as response data.

Step 104: The browser client receives the response data returned by the server, and reads the TTS page data by speech according to the TTS standard version number by using the TTS engine.

The browser client obtains a corresponding TTS standard protocol according to the TTS standard version number; parses out global reading information, local reading information, and to-be-read data from the TTS page data according to the TTS standard protocol; and obtains, by using the TTS engine, speech data corresponding to the to-be-read data, and reads the speech data according to the global reading information and the local reading information.

The operation of parsing out, by the browser client, global reading information, local reading information, and to-be-read data from the TTS page data according to the TTS standard protocol specifically includes: parsing out, by the browser client, the global reading information from header information of the TTS page data according to the TTS standard protocol; identifying, from the TTS page data, a data block corresponding to a preset tag, and determining the identified data block as the to-be-read data; and obtaining the local reading information from identified tag starting information of the preset tag.

When the browser client processes the TTS page data, a parser of the browser client parses the TTS page data according to the corresponding TTS standard version tag set, to extract the to-be-read data, the global reading information, and the local reading information, and invokes the TTS engine for reading by speech.

The operation of obtaining, by the browser client by using the TTS engine, speech data corresponding to the to-be-read data specifically includes: determining, by the browser client, the engine type of the TTS engine; if the engine type of the TTS engine installed on the browser client is the full-function engine, invoking, by the browser client, a local speech database by using the TTS engine, to convert the to-be-read data to the speech data; and if the engine type of the TTS engine installed on the browser client is the compact engine, loading, by the browser client, recorded speech resource data from the server, and invoking the loaded recorded speech resource data by using the TTS engine, to convert the to-be-read data to the speech data.

The recorded speech resource data is a speech resource associated with a specific text paragraph, and includes text word segmentation information inside. The compact TTS engine can identify the recorded speech resource data, and read a speech by using an index relationship between text words. A difference between the recorded speech resource data and the speech database is: because the speech database is a speech dictionary, the speech database can support real-time reading of any text; and because content of the recorded speech resource is already determinate, the recorded speech resource can support only reading of a particular text paragraph.

When the TTS engine installed on the browser client is the compact engine, the browser client is not configured with the local speech database. Therefore, to read the web page information by speech, the browser client needs to obtain the recorded speech resource data from the server. In this embodiment of the present disclosure, the recorded speech resource data may be obtained from the server by using the following two manners, specifically including:

In a first manner, the server identifies the engine type of the TTS engine installed on the browser, and if the engine type is the compact engine, actively delivers the recorded speech resource data to the browser client. Specifically, the server determines whether the engine type that is included in the TTS identity information of the page access request is a compact engine; and when determining that the engine type is the compact engine, obtains speech resource data stored by the server, and sends the speech resource data to the browser client.

In a second manner, if the engine type of the TTS engine installed on the browser is the compact engine, the client requests to obtain the speech resource data from the server. Specifically, the server receives a speech resource data obtaining request sent by the browser client, obtains speech resource data stored by the server, and sends the speech resource data to the browser client.

In this embodiment of the present disclosure, the browser client presets the speech playing control information, and the speech playing control information may be information such as "pause" or "play". If the engine type of the TTS engine is the full-function engine, and the browser client reads the TTS page data by speech according to the TTS standard version number by using the TTS engine, the user may speak to the terminal. The browser client collects speech information of the user, identifies the speech information of the user as text information by using the TTS engine, queries preset speech playing control information according to the text information, and if the text information matches preset speech playing control information, performs a speech playing control operation corresponding to the preset speech playing control information. For example, assuming that the text information identified according to the speech information of the user is "pause", the browser client pauses the web page information that is being played.

Based on the foregoing embodiments of the present disclosure, the method for reading web page information by speech is provided. The method is implemented by the browser client, and includes: sending, by a browser client, a page access request to a server, where the page access request includes a page address and TTS identity information; receiving, by the browser client, response data returned by the server according to the page access request, where the response data includes a TTS standard version number determined by the server according to the TTS identity information, and TTS page data corresponding to the page address; and reading, by the browser client, the TTS page data by speech according to the TTS standard version number by using a TTS engine. In addition, the method for reading web page information by speech is further provided. The method is implemented by the server end, and includes: receiving, by a server, a page access request sent by a browser client, where the page access request includes a page address and TTS identity information; determining, by the server, a TTS standard version number according to the TTS identity information, and obtain, according to the page address and the TTS identity information, TTS page data corresponding to the page address; and sending, by the server, the TTS page data and the TTS standard version number to the browser client as response data, so that the browser client reads the TTS page data by speech according to the TTS standard version number.

Example

The following describes the embodiments of the present disclosure based on an http protocol by using an example.

Step 101: A browser client sends a page access request based on an http protocol, that is, an http request to a website server or a browser background server. The http request includes a page address, and an X-TTS-info field identifier used to identify TTS identity information. The X-TTS-info is a field identifier newly added to the http request.

X-TTS-info: ver=AAAAA;engine-type=BBBBB.

AAAAA indicates a supported highest version number of a TTS standard, for example, "1.0".

BBBBB indicates a type of a used TTS engine, and "full" or "lite" may be selected. "Full" indicates that the TTS engine type is a full-function engine, and "lite" indicates that the TTS engine type is a compact engine.

Step 102: After the website server (or the browser background server) receives the http request, the website server obtains, according to the http request, TTS page data corresponding to the page address and a TTS standard version number included in the X-TTS-info.

Step 103: The website server (or the browser background server) compares the TTS standard version number in the X-TTS-info with a standard version of the server, and responds by adding the TTS page data and the TTS standard version number expected by the server in an http response. The http response should include the following field identifier: X-TTS-info: ver=CCCCC; CCCCC indicates the TTS standard version number expected by the website server (or the browser background).

Step 104: After the browser client receives the http response, the browser client parses out, from the "X-the TTS-info" field of the http response, the TTS version number with which the website server (or the browser background server) responds, and reads the TTS page data by speech according to the TTS version number by using the TTS engine.

The foregoing already describes the embodiments of the present disclosure with reference to accompanying drawings and examples. In the embodiments of the present disclosure, because the global reading information and the local reading information are specified and TTS tagging is performed on the page data by using the preset tag, html standard specifications are improved so that the html standard specifications support TTS tagging. The improved html standard specifications may be directly applied on an html page, TTS available statement may be performed on a text-type label, and the global reading information and the local reading information read by speech are correspondingly identified. In addition, in the embodiments of the present disclosure, the page access request sent by the browser client includes the TTS identity information, the response data returned by the server includes the TTS standard version number, a field is extended in an HTTP response protocol of the browser client and the server, and the extended HTTP protocol can support negotiation of the TTS standard version by the browser client and the server.

In the embodiments of the present disclosure, the browser client is installed with the TTS engine. The browser client sends the page access request including the page address and the TTS identity information to the server, receives the TTS page data that is returned by the server according to the page access request and that corresponds to the TTS standard version number and the page address, and reads the TTS page data by speech according to the TTS standard version number by using the TTS engine. In the present disclosure, page information is read by speech by using the TTS engine installed on the browser client. When it is inconvenient for a user to browse a web page with eyes or fatigue is caused because a web page has been browsed with eyes, and for users whose eyes have physical defects, read page information can be listened by using a sense of hearing. Therefore, a convenient hearing-based manner is provided to users to browse a web page.

Embodiment 2

Figure 2:
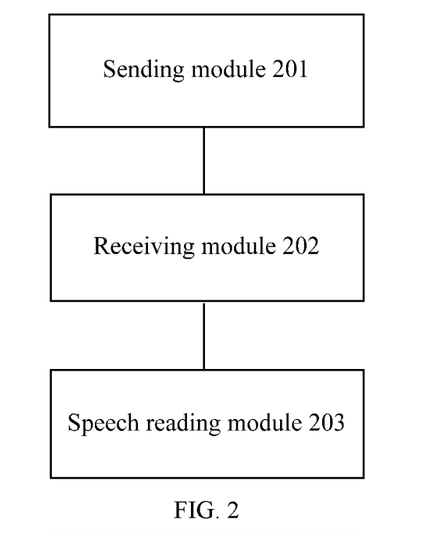
FIG. 2 is a schematic structural diagram of a browser client according to Embodiment 2 of the present disclosure.

Referring to FIG. 2, this embodiment of the present disclosure provides a browser client, and the browser client is configured to execute the method for reading web page information by speech. The browser client is installed with a TTS engine, and the browser client includes:

a sending module 201, configured to send a page access request to a server, where the page access request includes a page address and TTS identity information;

a receiving module 202, configured to receive response data returned by the server according to the page access request, where the response data includes a TTS standard version number determined by the server according to the TTS identity information, and TTS page data corresponding to the page address; and a speech reading module 203, configured to read the TTS page data by speech according to the TTS standard version number by using a TTS engine.

The speech reading module 203 includes: an obtaining unit, a parsing unit, and a reading unit.

The obtaining unit is configured to obtain a corresponding TTS standard protocol according to the TTS standard version number; the parsing unit is configured to parse out global reading information, local reading information, and to-be-read data from the TTS page data according to the TTS standard protocol; and the reading unit is configured to: obtain, by using the TTS engine, speech data corresponding to the to-be-read data, and read the speech data according to the global reading information and the local reading information.

The reading unit includes: a determining subunit, a first conversion subunit, and a second conversion subunit.

The determining subunit is configured to determine an engine type of the TTS engine, where the engine type includes a full-function engine and a compact engine; the first conversion subunit is configured to: if the engine type of the TTS engine installed on the browser client is the full-function engine, invoke a local speech database by using the TTS engine, to convert the to-be-read data to the speech data; and the second conversion subunit is configured to: if the engine type of the TTS engine installed on the browser client is the compact engine, load recorded speech resource data from the server, and invoke the loaded recorded speech resource data by using the TTS engine, to convert the to-be-read data to the speech data.

The parsing unit of the speech reading module 203 includes: a parsing subunit, an identification subunit, and an obtaining subunit.

The parsing subunit is configured to parse out the global reading information from header information of the TTS page data according to the TTS standard protocol; the identification subunit is configured to: identify, from the TTS page data, a data block corresponding to a preset tag, and determine the identified data block as the to-be-read data; and the obtaining subunit is configured to obtain the local reading information from identified tag starting information of the preset tag.

In this embodiment of the present disclosure, if the engine type of the TTS engine is the full-function engine, and the speech reading module 203 reads a speech, the browser client further includes a playing control module.

The playing control module is configured to: collect speech information of a user, and identify the speech information of the user as text information by using the TTS engine; and if the text information matches preset speech playing control information, perform a corresponding speech playing control operation.

In another embodiment of the present disclosure, a browser client device is further provided, including a memory and a processor. The memory is configured to store instructions, and the instructions are used to control the processor to perform an operation to execute any method implemented by using the browser client in Embodiment 1 of the present disclosure. In the embodiments of the present disclosure, the browser client is installed with the TTS engine. The browser client sends the page access request including the page address and the TTS identity information to the server, receives the TTS page data that is returned by the server according to the page access request and that corresponds to the TTS standard version number and the page address, and reads the TTS page data by speech according to the TTS standard version number by using the TTS engine. In the present disclosure, page information is read by speech by using the TTS engine installed on the browser client. When it is inconvenient for a user to browse a web page with eyes or fatigue is caused because a web page has been browsed with eyes, and for users whose eyes have physical problems, read page information can be listened by using a sense of hearing. Therefore, a convenient hearing-based manner is provided to users to browse a web page.

Embodiment 3

Figure 3:
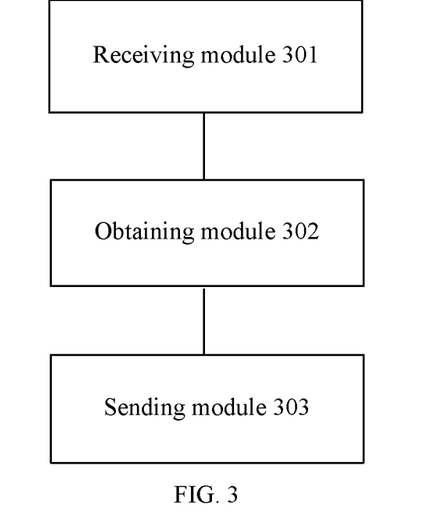
FIG. 3 is a schematic structural diagram of a server according to Embodiment 3 of the present disclosure.

Referring to FIG. 3, this embodiment of the present disclosure provides a server, and the server is configured to execute the method for reading web page information by speech provided in Embodiment 1. The server specifically includes:

a receiving module 301, configured to receive a page access request sent by a browser client, where the page access request includes a page address and TTS identity information of the browser client;

an obtaining module 302, configured to: determine a TTS standard version number according to the TTS identity information, and obtain, according to the page address and the TTS identity information, TTS page data corresponding to the page address, where The TTS identity information includes a TTS standard version number supported by the browser client and an engine type of the installed TTS engine; and the obtaining module 302 includes: a loading unit and a TTS tagging unit.

The loading unit is configured to load corresponding page data according to the page address; and the TTS tagging unit is configured to perform TTS tagging on the page data according to the TTS standard version number supported by the browser client and the engine type, to obtain the TTS page data corresponding to the page address.

The obtaining module 302 includes: a querying unit and an obtaining unit.

The querying unit is configured to: query, according to the TTS identity information and the page address, a local cache to determine whether there is corresponding TTS page data; and if there is corresponding TTS page data, obtain the TTS page data directly from the local cache; and the obtaining unit is configured to: when it is found that the local cache has no corresponding TTS page data, load corresponding page data according to the page address; and perform TTS tagging on the page data according to the TTS standard version number supported by the browser client and the engine type, to obtain the TTS page data corresponding to the page address.

In this embodiment of the present disclosure, the server further includes: a storage module, configured to store the TTS identity information, the page address, and the TTS page data in the local cache.

When TTS tagging is performed on the page data according to the TTS standard version number supported by the browser client and the engine type, a determining subunit is configured to: determine, according to the TTS standard version number supported by the browser client, a TTS standard version tag set supported by the browser client; and determine, according to the engine type, a TTS tag policy corresponding to the engine type; an adding subunit is configured to add global reading information to header information of the page data according to the TTS standard version tag set and the TTS tag policy; and a tagging subunit is configured to: determine, in the page data, a data block that needs to be read by speech, tag the data block according to the TTS standard version tag set and the TTS tag policy by using a preset tag, and add local reading information to tag starting information of the preset tag.

In this embodiment of the present disclosure, the TTS identity information further includes the TTS standard version number supported by the browser client; and the obtaining module 302 determines the TTS standard version number by using a comparing unit, a first determining unit, and a second determining unit.

The comparing unit is configured to compare the TTS standard version number supported by the browser client with a version number supported by the server; the first determining unit is configured to: when the TTS standard version number supported by the browser client is higher than the version number supported by the server, determine the version number supported by the server as the TTS standard version number; and a second determining unit is configured to: when the TTS standard version number supported by the browser client is lower than or equal to the version number supported by the server, determine the TTS standard version number supported by the browser client as the TTS standard version number.

The sending module 303 is configured to send the TTS page data and the TTS standard version number to the browser client as response data, so that the browser client reads the TTS page data by speech according to the TTS standard version number.

In this embodiment of the present disclosure, the server further includes:

an obtaining and sending module, configured to: determine whether the engine type of the TTS engine that is included in the TTS identity information of the page access request is a compact engine; and when determining that the engine type is the compact engine, obtain speech resource data stored by the server, and send the speech resource data to the browser client; or the obtaining and sending module is further configured to: receive a speech resource data obtaining request sent by the browser client, obtain speech resource data stored by the server, and send a speech database to the browser client.

In another embodiment of the present disclosure, a server device is further provided, including a memory and a processor. The memory is configured to store instructions, and the instructions are used to control the processor to perform an operation to execute any method implemented by using the server in Embodiment 1 of the present disclosure.

In the embodiments of the present disclosure, the browser client is installed with the TTS engine. The browser client sends the page access request including the page address and the TTS identity information to the server, receives the TTS page data that is returned by the server according to the page access request and that corresponds to the TTS standard version number and the page address, and reads the TTS page data by speech according to the TTS standard version number by using the TTS engine. In the present disclosure, page information is read by speech by using the TTS engine installed on the browser client. When it is inconvenient for a user to browse a web page with eyes or fatigue is caused because a web page has been browsed with eyes, and for users whose eyes have physical problems, the read page information can be listened by using a sense of hearing. Therefore, a convenient hearing-based manner is provided to users to browse a web page.

In the several embodiments provided in the present application, it should be understood that the disclosed browser client, server, and method may be implemented in other manners. The described device embodiments are merely exemplary. For example, the unit division is merely logical function division and may be other division during actual implementation. For another example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some steps of the methods described in the embodiments of the present disclosure. The foregoing storage medium includes: various mediums that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for reading web page information by speech, comprising:

sending, by a browser client, a page access request to a server, wherein the page access request comprises a page address and text to speech (TTS) identity information, and the TTS identity information comprises a first TTS standard version number supported by the browser client, wherein the page access request enables the server to perform operations comprising:

comparing the first TTS standard version number supported by the browser client with a version number supported by the server;

when the first TTS standard version number supported by the browser client is higher than the version number supported by the server, determining, by the server, the version number supported by the server as a second TTS standard version number; and when the first TTS standard version number supported by the browser client is lower than or equal to the version number supported by the server, determining, by the server, the first TTS standard version number supported by the browser client as the second TTS standard version number;

receiving, by the browser client, response data returned by the server according to the page access request, wherein the response data comprises TTS page data corresponding to the page address and the second TTS standard version number determined by the server; and reading, by the browser client, the TTS page data by speech according to the second TTS standard version number.

2. The method according to claim 1, wherein the reading, by the browser client, the TTS page data by speech according to the second TTS standard version number comprises:

obtaining, by the browser client, a corresponding TTS standard protocol according to the second TTS standard version number;

parsing out, by the browser client, global reading information, local reading information, and to-be-read data from the TTS page data according to the TTS standard protocol; and obtaining, by using a TTS engine of the browser client, speech data corresponding to the to-be-read data, and reading the speech data according to the global reading information and the local reading information.

3. The method according to claim 2, wherein the obtaining, by the browser client by using the TTS engine, speech data corresponding to the to-be-read data comprises:

determining, by the browser client, an engine type of the TTS engine, wherein the engine type comprises a full-function engine and a compact engine;

if the engine type of the TTS engine installed on the browser client is the full-function engine, invoking, by the browser client, a local speech database by using the TTS engine, to convert the to-be-read data to the speech data; and if the engine type of the TTS engine installed on the browser client is the compact engine, loading, by the browser client, recorded speech resource data from the server, and invoking the loaded recorded speech resource data by using the TTS engine, to convert the to-be-read data to the speech data.

4. The method according to claim 2, wherein the parsing out, by the browser client, global reading information, local reading information, and to-be-read data from the TTS page data according to the TTS standard protocol comprises:

parsing out, by the browser client, the global reading information from header information of the TTS page data according to the TTS standard protocol;

identifying, by the browser client from the TTS page data, a data block corresponding to a preset tag, and determining the identified data block as the to-be-read data; and obtaining, by the browser client, the local reading information from identified tag starting information of the preset tag.

5. The method according to claim 3, wherein if the engine type of the TTS engine is the full-function engine, and the browser client reads the TTS page data by speech according to the second TTS standard version number by using the TTS engine, the method further comprises:

collecting, by the browser client, speech information of a user, and identifying the speech information of the user as text information by using the TTS engine; and if the text information matches preset speech playing control information, performing a corresponding speech playing control operation.

6. A method for reading web page information by speech, wherein the method comprises:

receiving, by a server, a page access request sent by a browser client, wherein the page access request comprises a page address and text to speech (TTS) identity information, wherein the TTS identity information comprises a first TTS standard version number supported by the browser client;

determining, by the server, a second TTS standard version number by performing operations comprising:

comparing, by the server, the first TTS standard version number supported by the browser client with a version number supported by the server;

when the first TTS standard version number supported by the browser client is higher than the version number supported by the server, determining, by the server, the version number supported by the server as the second TTS standard version number; and when the first TTS standard version number supported by the browser client is lower than or equal to the version number supported by the server, determining, by the server, the first TTS standard version number supported by the browser client as the second TTS standard version number; and obtaining, by the server according to the page address and the TTS identity information, TTS page data corresponding to the page address; and sending, by the server, the TTS page data and the second TTS standard version number to the browser client as response data for the browser client to read the TTS page data by speech according to the second TTS standard version number.

7. The method according to claim 6, wherein the TTS identity information further comprises an engine type of a TTS engine installed on the browser client; and the obtaining, by the server according to the page address and the TTS identity information, TTS page data corresponding to the page address comprises:

loading, by the server, corresponding page data according to the page address;

performing, by the server, TTS tagging on the page data according to the first TTS standard version number supported by the browser client and the engine type, to obtain the TTS page data corresponding to the page address; and storing, by the server, the TTS identity information, the page address, and the TTS page data in a local cache.

8. The method according to claim 6, wherein the TTS identity information further comprises an engine type of a TTS engine installed on the browser client; and the obtaining, by the server according to the page address and the TTS identity information, TTS page data corresponding to the page address comprises:

querying, by the server according to the TTS identity information and the page address, a local cache to determine whether there is corresponding TTS page data; and if there is corresponding TTS page data, obtaining the TTS page data directly from the local cache; and when the local cache has no corresponding TTS page data, loading, by the server, corresponding page data according to the page address; and performing TTS tagging on the page data according to the first TTS standard version number supported by the browser client and the engine type, to obtain the TTS page data corresponding to the page address.

9. The method according to claim 7, wherein the performing, by the server, TTS tagging on the page data according to the first TTS standard version number supported by the browser client and the engine type comprises:

determining, by the server according to the first TTS standard version number supported by the browser client, a TTS standard version tag set supported by the browser client; and determining, according to the engine type, a TTS tag policy corresponding to the engine type;

adding, by the server, global reading information to header information of the page data according to the TTS standard version tag set and the TTS tag policy; and determining, by the server in the page data, a data block that needs to be read by speech, tagging the data block according to the TTS standard version tag set and the TTS tag policy by using a preset tag, and adding local reading information to tag starting information of the preset tag.

10. A browser client for reading web page information by speech comprising one or more processors and one or more non-transitory computer readable storage media storing instructions executable by the one or more processors to cause the browser client to perform operations comprising:
sending a page access request to a server, wherein the page access request comprises a page address and text to speech (TTS) identity information, and the TTS identity information comprise a first TTS standard version number supported by the browser client, wherein the page access request enables the server to perform operations comprising:
comparing the first TTS standard version number supported by the browser client with a version number supported by the server;
when the first TTS standard version number supported by the browser client is higher than the version number supported by the server, determining, by the server, the version number supported by the server as a second TTS standard version number; and
when the first TTS standard version number supported by the browser client is lower than or equal to the version number supported by the server, determining, by the server, the first TTS standard version number supported by the browser client as the second TTS standard version number;
receiving response data returned by the server according to the page access request, wherein the response data comprises TTS page data corresponding to the page address, and the second TTS standard version number determined by the server; and
reading, the TTS page data by speech according to the second TTS standard version number by using a TTS engine.

11. The browser client according to claim 10, wherein the reading the TTS page data by speech according to the second TTS standard version number comprises:
obtaining a corresponding TTS standard protocol according to the second TTS standard version number;
parsing out global reading information, local reading information, and to-be-read data from the TTS page data according to the TTS standard protocol; and
obtaining, by using the TTS engine, speech data corresponding to the to-be-read data, and read the speech data according to the global reading information and the local reading information.

12. The browser client according to claim 11, wherein the obtaining, by using the TTS engine, speech data corresponding to the to-be-read data comprises:
determining an engine type of the TTS engine, wherein the engine type comprises a full-function engine and a compact engine;
if the engine type of the TTS engine installed on the browser client is the full-function engine, invoking a local speech database by using the TTS engine, to convert the to-be-read data to the speech data; and
if the engine type of the TTS engine installed on the browser client is the compact engine, loading recorded speech resource data from the server, and invoking the loaded recorded speech resource data by using the TTS engine, to convert the to-be-read data to the speech data.

13. The browser client according to claim 11, wherein the parsing out global reading information, local reading information, and to-be-read data from the TTS page data according to the TTS standard protocol comprises:
parsing out the global reading information from header information of the TTS page data according to the TTS standard protocol;
identifying, from the TTS page data, a data block corresponding to a preset tag, and determining the identified data block as the to-be-read data; and
obtaining the local reading information from identified tag starting information of the preset tag.

14. The browser client according to claim 12, wherein if the engine type of the TTS engine is the full-function engine, and the browser client reads the TTS page data by speech according to the second TTS standard version number by using the TTS engine, the operations further comprise:
collecting speech information of a user, and identifying the speech information of the user as text information by using the TTS engine; and
if the text information matches preset speech playing control information, performing a corresponding speech playing control operation.

15. A server for reading web page information by speech comprising one or more processors and one or more non-transitory computer readable storage media storing instructions executable by the one or more processors to cause the server to perform operations comprising:
receiving a page access request sent by a browser client, wherein the page access request comprises a page address and text to speech (TTS) identity information of the browser client, wherein the TTS identity information comprises a first TTS standard version number supported by the browser client;
determining a second TTS standard version number by performing operations comprising:
comparing the first TTS standard version number supported by the browser client with a version number supported by the server;
when the first TTS standard version number supported by the browser client is higher than the version number supported by the server, determining the version number supported by the server as the second TTS standard version number; and
when the first TTS standard version number supported by the browser client is lower than or equal to the version number supported by the server, determining the first TTS standard version number supported by the browser client as the second TTS standard version number; and
obtaining, according to the page address and the TTS identity information, TTS page data corresponding to the page address;
sending the TTS page data and the second TTS standard version number to the browser client as response data, so that the browser client reads the TTS page data by speech according to the second TTS standard version number; and
storing the TTS identity information, the page address, and the TTS page data in a local cache.

16. The server according to claim 15, wherein the TTS identity information further comprises an engine type of a TTS engine installed on the browser client; and the obtaining, according to the page address and the TTS identity information, TTS page data corresponding to the page address comprises:
loading corresponding page data according to the page address; and performing TTS tagging on the page data according to the first TTS standard version number supported by the browser client and the engine type, to obtain the TTS page data corresponding to the page address.

17. The server according to claim 15, wherein the TTS identity information further comprises an engine type of a TTS engine installed on the browser client; and the obtaining, according to the page address and the TTS identity information, TTS page data corresponding to the page address comprises:

querying, according to the TTS identity information and the page address, the local cache to determine whether there is corresponding TTS page data; and if there is corresponding TTS page data, obtaining the TTS page data from the local cache; and when the local cache has no corresponding TTS page data, loading corresponding page data according to the page address; and performing TTS tagging on the page data according to the first TTS standard version number supported by the browser client and the engine type, to obtain the TTS page data corresponding to the page address.

18. The server according to claim 16, wherein the performing TTS tagging on the page data according to the first TTS standard version number supported by the browser client and the engine type comprises:

determining, according to the first TTS standard version number supported by the browser client, a TTS standard version tag set supported by the browser client; and determining, according to the engine type, a TTS tag policy corresponding to the engine type;

adding global reading information to header information of the page data according to the TTS standard version tag set and the TTS tag policy; and determining, in the page data, a data block that needs to be read by speech, tagging the data block according to the TTS standard version tag set and the TTS tag policy by using a preset tag, and adding local reading information to tag starting information of the preset tag.

* * * * *